O. AND T. KLOSTER.
FISH DRESSING MACHINE.
APPLICATION FILED MAY 8, 1918.
1,331,932.
Patented Feb. 24, 1920.
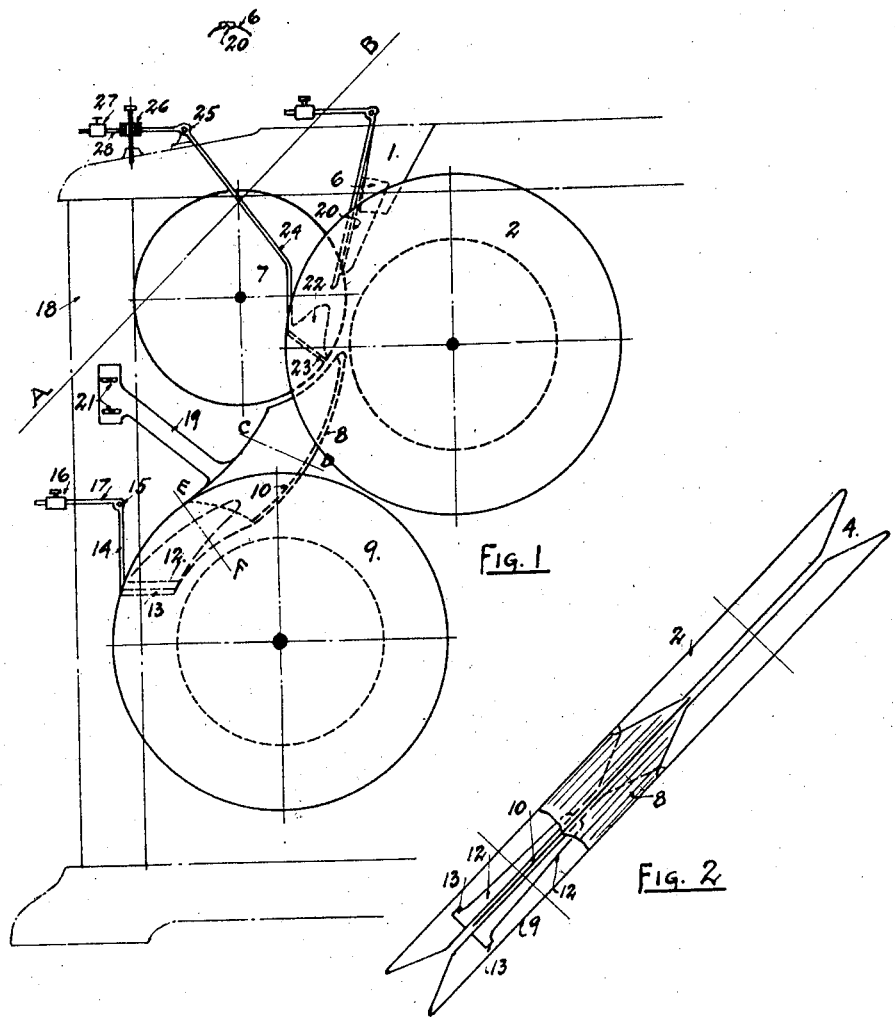
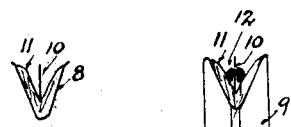
Inventors
Ole Kloster
Theodor Kloster

UNITED STATES PATENT OFFICE.

OLE KLOSTER AND THEODOR KLOSTER, OF STAVANGER, NORWAY.

FISH-DRESSING MACHINE.

1,331,932.  Specification of Letters Patent.  Patented Feb. 24, 1920.

Application filed May 8, 1918. Serial No. 233,379.

*To all whom it may concern:*

Be it known that we, OLE KLOSTER and THEODOR KLOSTER, subjects of the King of Norway, residing at Stavanger, Norway, have invented Fish-Dressing Machines; and we do hereby declare the following to be a full, clear, and exact description of the invention, such as will enable others skilled in the art to which it appertains to make and use the same, reference being had to the accompanying drawing, and to letters or figures of reference marked thereon which form a part of this specification.

This invention relates to fish dressing machines.

Heretofore, the machines designed for such purpose have been very complex and expensive. Since such machines are usually operated by operators of little or no skill, it is highly important that they be as simple as possible. Furthermore, since such machines are often located at places comparatively remote and inaccessible, it is important that they be of simple construction so that they may be repaired easily.

One of the primary objects of this invention is to provide a fish dressing machine which will operate by splitting the fish preferably lengthwise, approximately along the medial abdominal line and causes the entrails to be removed, and also we purpose providing such a machine of simple and inexpensive construction.

The above mentioned general objects of our invention, together with others inhering in the same, are attained by the mechanism illustrated in the following drawings, the same being merely a preferred exemplary form of embodiment of our invention, throughout which drawings like reference numerals indicate like parts.

Figure 1 is a diagrammatic view in side elevation of a fish dressing machine embodying our invention.

Fig. 2, is a view on broken line A, B showing the two carrier wheels, guideway and entrail remover.

Fig. 3, is a sectional view on broken line C, D.

Fig. 4, is a sectional view on broken line, E, F.

A chamber 1, serving as a hopper, is provided above a wheel 2, which wheel has a groove 4 cut in its circumferential face. This groove may or may not extend to the axis of the wheel. A steering piece 6 is pivotally mounted so as to extend within said groove 4. Also extending into the groove 4 close at the end of the steering piece 6 is the knife 7, preferably of a rotary form, which cuts the fish lengthwise along its abdomen. A V shaped guide or trough 8 is secured below the knife 7, having one end portion extending within the groove 4 and the other end portion extending within the groove of a wheel 9 similar in construction to wheel 2—said guide being held by arm 19, adjustably mounted by means of set screws 21. A medially positioned plate or spreader 10 holds the walls of the fish apart. On each side of this plate is an entrail remover 12, having its wing walls expanding and terminating in the transversely disposed sharp edges or knives 13 which scrape out the offal. This entrail remover is pivotally mounted at 15 on the arm 14, and is maintained in position by means of the weight 16 on arm 17.

The operation of our invention is at follows:—

A fish is fed to the machine through the hopper 1 with its back down so that when it is carried by wheel 2 against the knife 7 it will present to that knife its belly side. In order the better to insure maintaining the fish on edge with its back down, I provide the movable guide 6 with its groove 20. The fish then falls by gravity down the guide 8 until it strikes the groove in the wheel 9, which carries it against the entrail remover 12, the walls of the fish having been held apart by the plate 10. They are further forced apart and put under a tension by the expanding wing walls of said entrail remover, so that the sharp edges 13 can operate to scrape out and remove the offal.

Instead of having the second wheel 9 and the entrail remover 12, an entrail remover similar in construction to said remover 12 might be pivotally mounted at 25, being urged forward by weight 27 and limited in its movements by screw 26 on arm 28, so that its wings 22 operate immediately after the splitting of the fish by the knife 7 to hold the fish side walls apart and to cause its sharp edge 23 to scrape and remove the offal.

Obviously, changes may be made in the forms, dimensions and arrangements of the parts of my invention without departing from the principle thereof, the above setting forth only a preferred form of embodiment.

We claim—

1. A fish dressing machine comprising a carrier wheel formed by providing same with a deep groove on its circumferential face to hold the fish, a knife operatively disposed opposite said wheel whereby the fish is slitted lengthwise by being pressed against said knife, and an entrail remover disposed on each side of said knife.

2. A fish dressing machine comprising a fish steering piece, a carrier wheel formed by providing same with a deep groove on its circumferential face to hold the fish, a knife operatively disposed opposite said wheel whereby the fish is slitted lengthwise by being pressed against said knife, and an entrail remover disposed on each side of said knife.

3. A fish dressing machine comprising a carrier wheel formed by providing same with a deep groove on its circumferential face to hold the fish, a knife operatively disposed opposite said wheel whereby the fish is slitted lengthwise by being pressed against said knife while being carried by said wheel, a V shaped guideway provided with a body wall spreader in which guideway the fish moves by gravity, a second carrier wheel provided with a deep groove on its circumferential face disposed to receive the fish from said guideway, and an entrail remover formed by a scraper adjustably maintained against the inside sidewalls of the fish and guided by a wing-like projection, the ends of which extend on either side of the spreader within the guide.

In testimony that we claim the foregoing as our invention, we have signed our names in presence of two subscribing witnesses.

OLE KLOSTER.
THEODOR KLOSTER.

Witnesses:
O. RISVOLD,
H. COUSETINSSEN.